(No Model.)
J. F. WELCOME.
HARNESS.
No. 489,440. Patented Jan. 3, 1893.
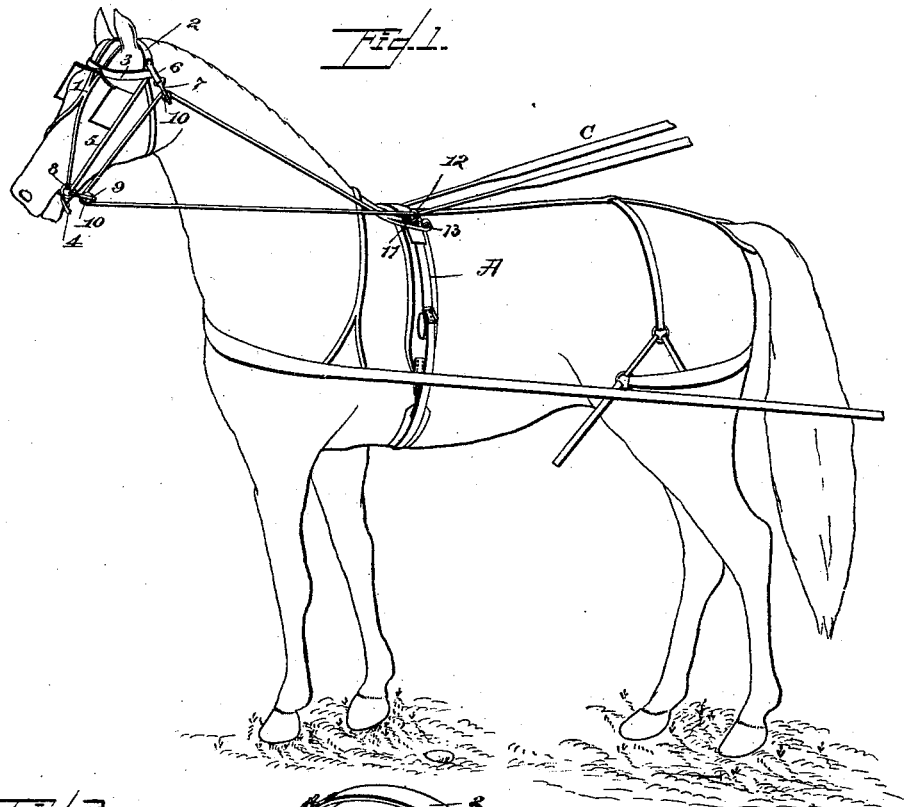
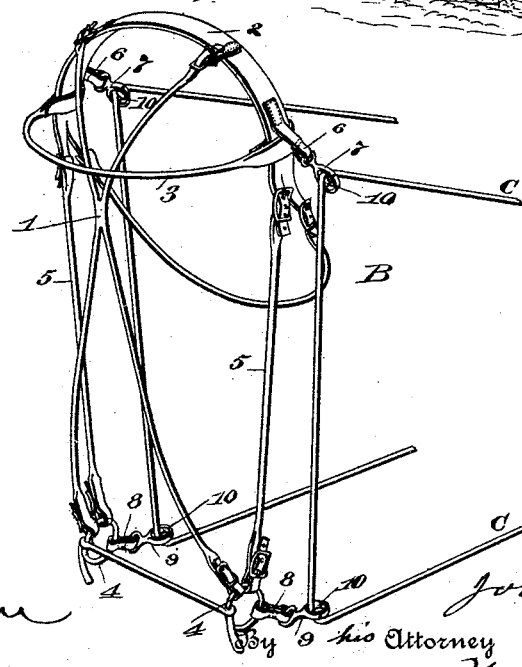

UNITED STATES PATENT OFFICE.

JONAS F. WELCOME, OF RICHMOND, VIRGINIA.

HARNESS.

SPECIFICATION forming part of Letters Patent No. 489,440, dated January 3, 1893.

Application filed November 6, 1891. Serial No. 411,115. (No model.)

*To all whom it may concern:*

Be it known that I, JONAS F. WELCOME, a citizen of the United States of America, residing at Richmond, in the county of Henrico and State of Virginia, have invented certain new and useful Improvements in Harness, of which the following is a specification, reference being had therein to the accompanying drawings.

This invention relates to an improvement in harness; and it has for its objects, first, to provide a harness in which the employment of a check-rein or strap, either of the overhead or of the side style, is rendered unnecessary, and in which the reins serve the double function of a check-strap and of the reins proper; secondly, to provide a bit-adjusting strap for connecting the crown-strap and the bit, whereby the latter may be so adjusted as to prevent the horse catching it between his teeth, and at the same time permit of the bit having perfect freedom of movement; thirdly, to provide a bridle having a series of gag-runners so arranged thereon that when the reins are in position any strain applied thereto will cause a vertical instead of a horizontal movement of the bit, whereby, all danger of the horse catching the bit will be effectually overcome; and, fourthly, to provide gag-runners having rollers designed to reduce the friction and the consequent chafing and wear between the said runners and the reins or other portion of the harness passing through the same.

The invention consists in the novel construction and combination of parts of a harness as will be hereinafter fully described and claimed.

In the drawings: Figure 1 is a side elevation, showing a horse having my improved harness in position thereon. Fig. 2 is a perspective view of the bridle.

Referring to the drawings, A designates the harness-saddle which may be of any desired or approved construction; B the bridle, and C the reins. The bridle B is of the ordinary construction, with this difference: instead of rigidly securing the bit-strap 1 to the center of the crown-strap 2, as is usually done, the bit-strap is bifurcated at its upper end, and the two ends thus formed are adjustably secured, preferably by a buckle connection, to the crown-strap one on each side, near the points of attachment of the brow-band 3. The lower end of the bit-strap is also bifurcated, and the bifurcated portions are adjustably secured to the bit-rings 4, as are also the side straps 5, the upper ends of the latter being adjustably secured to the ends of the crown-strap, as clearly shown in Fig. 2. By thus constructing the bit-strap, the bit may be adjusted so as to cause it to bear against the corners of the horse's mouth with sufficient force to prevent any lateral displacement, and yet without causing the animal any undue pain, whereby the bit is held in place when the animal throws back his head, thus preventing him catching the bit, as the tension thereon will always be the same no matter in what position the animal's head may be held.

Upon each side of the crown-strap, preferably near its ends, is secured a loop 6, in which is movably attached a gag-runner 7, and to each of the bit-rings is similarly secured a loop 8, carrying a gag-runner 9; and through these runners the reins C are passed, as clearly shown in Fig. 2. Each of the gag-runners carries a roller 10, which may be either grooved, as shown, or flat, the configuration being governed by the shape of the reins; and on these rollers bear the reins, by which means all undue friction between the runners and the reins is reduced to a minimum. One end of each of the reins is slotted, as at 11, Fig. 1, which slot is to admit of the ends being slipped over the terret-rings 12, whereby to secure the said ends to a fixed portion of the harness in rear of the horse's head. Immediately back of the slot in each of the reins is secured a stop 13, to prevent the ends of the reins from slipping through either of the gag-runners should the terret-rings break or the reins become detached from any cause.

Having thus described the different parts of my improved harness, I will explain its operation:

The bridle being in place on the horse, one end of each of the reins is secured on one of the terret-rings in the manner already described. The free ends of the reins are now passed through the gag-runners 7, thence down and through the runners 9, and thence back through the terret-rings. It will be seen by reference to Fig. 1, that the reins take the place of the ordinary check-strap, and that by the arrangement of the gag-runners a much greater strain can be applied to the bit with less expenditure of power than with bridles of the ordinary construction, inasmuch as the gag-runners 7 and 9 form fulcrums for the reins. Moreover, by this arrangement the bit is caused to move in a vertical line when strain is applied to the reins, and this feature, taken in connection with the adjustable bit-strap 1, effectually prevents the horse from catching the bit between its teeth.

Another important feature of this invention is that the horse's head has free play when the reins are loose, and also that it is unnecessary to loosen any part of the harness to allow the animal either to eat or take water while hitched to the vehicle, the only manipulation required for either of the above accommodations being to allow the reins to slacken as much as may be necessary to admit the horse to reach the food or the water.

Having thus fully described my invention, what I claim as new and desire to secure by Letters Patent, is—

In a harness, a bridle having gag-runners on each side thereof and carried respectively by the crown-strap and the bit-rings, and a harness-saddle having terret-rings, in combination with the reins, one end of each of which is suitably secured to one of the terret-rings, the free portion of the reins being passed through the said runners and the terret-rings.

In testimony whereof I affix my signature in presence of two witnesses.

JONAS F. WELCOME.

Witnesses:
   HUGH ANTRIM,
   F. M. PARRISH.